(12) United States Patent
Ohnishi

(10) Patent No.: US 7,739,373 B2
(45) Date of Patent: Jun. 15, 2010

(54) DETECTING WHETHER A CONNECTION BETWEEN APPARATUSES INCLUDES A PREDETERMINED TRANSMISSION MEDIUM

(75) Inventor: Shinji Ohnishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 822 days.

(21) Appl. No.: 10/733,295

(22) Filed: Dec. 12, 2003

(65) Prior Publication Data

US 2004/0122991 A1   Jun. 24, 2004

(30) Foreign Application Priority Data

Dec. 13, 2002   (JP) ............... 2002-362918

(51) Int. Cl.
*G06F 15/16* (2006.01)
*G06F 15/173* (2006.01)
*G06F 3/00* (2006.01)

(52) U.S. Cl. ............ 709/224; 709/204; 709/227; 709/228; 709/229; 710/15

(58) Field of Classification Search ........... 709/224, 709/253; 710/15, 313
See application file for complete search history.

(56) References Cited

U.S. PATENT DOCUMENTS

| | | | | |
|---|---|---|---|---|
| 5,991,829 | A * | 11/1999 | Giorgio et al. ........... | 710/15 |
| 6,314,476 | B1 * | 11/2001 | Ohara ..................... | 710/15 |
| 6,882,334 | B1 * | 4/2005 | Meyer .................... | 345/156 |
| 2001/0033554 | A1 * | 10/2001 | Ayyagari et al. ......... | 370/328 |
| 2002/0052966 | A1 | 5/2002 | Isomura | |
| 2002/0078161 | A1 * | 6/2002 | Cheng .................... | 709/208 |
| 2002/0111138 | A1 * | 8/2002 | Park ....................... | 455/41 |
| 2004/0090984 | A1 * | 5/2004 | Saint-Hilaire et al. ..... | 370/463 |
| 2004/0133415 | A1 * | 7/2004 | Rappaport et al. ........ | 703/22 |
| 2004/0203698 | A1 * | 10/2004 | Comp ..................... | 455/421 |

FOREIGN PATENT DOCUMENTS

| | | |
|---|---|---|
| JP | 2002-037520 | 6/2002 |
| JP | 2002-196990 | 7/2002 |
| JP | 2002-135474 | 10/2002 |

OTHER PUBLICATIONS

Johanson; "IPv4 Over IEE 1394", RFC 2734, Dec. 1999.*
Fujisawa "DHCP for IEEE 1394", RFC 2855, Jun. 2000.*
"Universal Plug and Play Device Architecture", Version 1.0, Jun. 8, 2000, pp. 1-64.
"IEEE Std 1394-1995, IEEE Standard for a High Performance Serial Bus, Institute of Electrical and Electronics Engineers, Inc."

(Continued)

*Primary Examiner*—Vivek Srivastava
*Assistant Examiner*—Lin Liu
(74) *Attorney, Agent, or Firm*—Fitzpatrick, Cella, Harper & Scinto

(57) ABSTRACT

After a device having a particular function is detected from among devices connected to a network and if a transmission medium to the detected device is not a transmission medium compatible with a predetermined transmission system, an alarm message is displayed. A user can therefore be notified of that the detected device is not connected through a transmission medium suitable for data communications.

12 Claims, 8 Drawing Sheets

OTHER PUBLICATIONS

"IEEE Std 1394a-2000, IEEE Standard for a High Performance Serial Bus—Amendment 1".

"IEC 61883-1, Consumer audio/video equipment—Digital interface—Part 1: General, First edition, Feb. 1998, pp. 1-83".

Takeshi Saito, et al., "Homenetwork Architecture Considering Digital Home Appliances" Technical Report of IEICE (Institute of Electronics, Information and Communication Engineers, vol. 97, No. 368, pp. 57-64 (partial English translation included).

Satoshi Yoneda, "Universal Plug and Play", DOS/V Magazine, vol. 11, No. 12 (partial English translation included).

English translation of document previously cited in the Jan. 22, 2008 Information Disclosure Statement as: Takeshi Saito, et al., "Homenetwork Architecture Considering Digital Home Appliances" Technical Report of IEICE (Institute of Electronics, Information and Communication Engineers, vol. 97, No. 368, pp. 57-64.

English translation of document previously cited in the Jan. 22, 2008 Information Disclosure Statement as: Satoshi Yoneda, "Universal Plug and Play", DOS/V Magazine, vol. 11, No. 12.

English translation of Japanese Office Action dated Nov. 6, 2007 issued in related Japanese application No. 2002-362918.

* cited by examiner

FIG. 3

| BYTE OFFSET | FIELD NAME |
|---|---|
| 00 | hardware_type |
| 01 | |
| 02 | protocol_type |
| 03 | |
| 04 | hw-addr_len |
| 05 | IP-addr_len |
| 06 | opcode |
| 07 | |
| 08 | sender_unique_ID |
| 09 | |
| 10 | |
| 11 | |
| 12 | |
| 13 | |
| 14 | |
| 15 | |
| 16 | sender_max_rec |
| 17 | sspd |
| 18 | sender_unicast_FIFO_hi |
| 19 | |
| 20 | sender_unicast_FIFO_lo |
| 21 | |
| 22 | |
| 23 | |
| 24 | sender_IP_address |
| 25 | |
| 26 | |
| 27 | |
| 28 | target_IP_address |
| 29 | |
| 30 | |
| 31 | |

31

32

DETECTING WHETHER A CONNECTION BETWEEN APPARATUSES INCLUDES A PREDETERMINED TRANSMISSION MEDIUM

BACKGROUND OF THE INVENTION

1. Field of the Invention

The present invention relates to a communication apparatus connectable to a network via a digital interface.

2. Related Background Art

There are many digital device having a digital interface for communications with external devices and the like. Such digital devices are interconnected through digital interfaces so that a network system can be configured. Conventionally, one network system has been configured by using only one type of digital interfaces, and it is difficult to configure the network system using different types of digital interfaces.

As one method of solving this problem, UPnP (Universal Plug and Player) has been proposed (Reference Document 1: Universal Plug and Play Device Architecture, Version 1.0, 08 Jun. 2000). UPnP performs communications among different interfaces by using the IP (Internet Protocol). UPnP can therefore configure a network system using different types of interfaces, independently from transmission media compatible with interfaces.

FIG. 9 shows an example of a network system in conformity with UPnP (hereinafter called a UPnP network system). Referring to FIG. 9, a DTV 103 as a control point can detect and control a DVCR 104 as a device. However, DTV 103 and DVCR 104 are not directly connected through a transmission medium capable of data communications in conformity with the IEEE1394 Standard (Reference Document 2: IEEE Std 1394-1995, IEEE Standard for a High Performance Serial Bus, Institute of Electrical and Electronics Engineers, Inc.), and DTV 103 cannot receive moving image data from DVCR 104 using the IEC61883 protocol (Reference Document 3: IEC 61883-1, Consumer audio/video equipment—Digital interface—Part 1: General). Therefore, in the UPnP network such as shown in FIG. 9, even if a user operates a panel for controlling DVCR 104 displayed on the display screen of DTV 103, a reproduced image will not be displayed on the screen. Even if each device connected to the UPnP network operates normally, a user may judge that the device is out of order.

SUMMARY OF THE INVENTION

An object of the present invention is to overcome the above-described drawbacks.

Another object of the present invention is to notify a user of that a transmission side device and a reception side device are not connected through a transmission medium capable of data transmission/reception.

A preferred embodiment of the present invention provides a communication apparatus connected to a network having a plurality of transmission media, comprising: detecting means for detecting whether or not the communication apparatus and a communication partner are connected through a predetermined transmission medium, wherein if the detecting means detects that the communication apparatus and the communication partner are not connected through the predetermined transmission medium, predetermined information is notified to a user.

Still other objects, features and advantages of the present invention will become fully apparent from the following detailed description of the preferred embodiments.

BRIEF DESCRIPTION OF THE DRAWINGS

FIG. 3 is a diagram showing the format of an ARP request/response packet of IP over 1394.

DESCRIPTION OF THE PREFERRED EMBODIMENTS

Preferred embodiments of the present invention will be described with reference to the accompanying drawings.

First Embodiment

Figure 1:
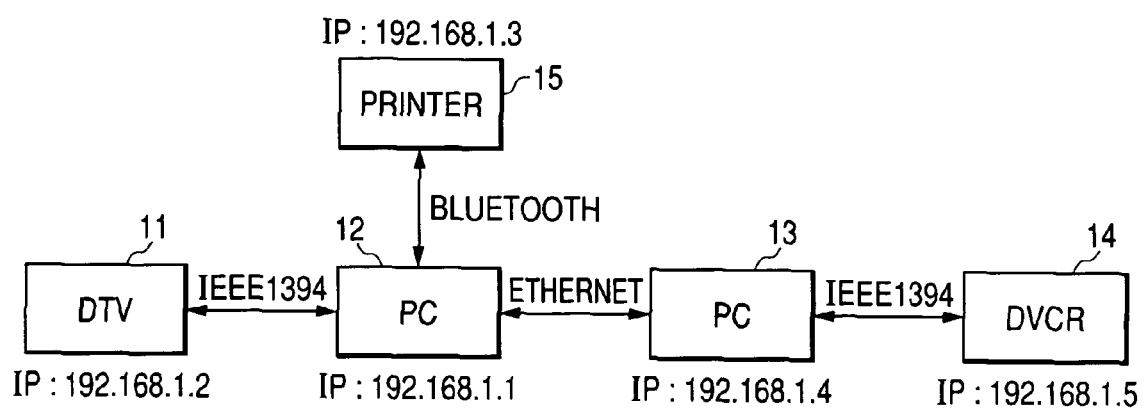
FIG. 1 is a block diagram showing an example of the structure of a UPnP network system adopting a communication apparatus according to a first embodiment of the present invention.

FIG. 1 is a block diagram showing an example of the structure of a UPnP network system adopting a communication apparatus of the first embodiment. In FIG. 1, examples of IP addresses assigned to respective devices are also shown.

The UPnP network system shown in FIG. 1 is constituted of a DTV 11 (IP address: 192.168.1.2), a PC 12 (IP address: 192.168.1.1), a PC 13 (IP address: 192.168.1.4), a DVCR 14 (IP address: 192.168.1.5) and a printer 15 (IP address: 192.168.1.3).

DTV 11 and PC 12 are interconnected through a transmission medium (first IEEE1394 bus) capable of data communications in conformity with the IEEE1394 Standard, and PC 12 and PC 13 are interconnected through a transmission medium capable of data communications in conformity with the Ethernet (R) Standard. PC 12 and the printer 15 are interconnected through a transmission medium capable of data communications in conformity with the Bluetooth Standard, and PC 13 and DVCR 14 are interconnected through a transmission medium (second IEEE1394 bus) capable of data communications in conformity with the IEEE1394 Standard.

Figure 2:
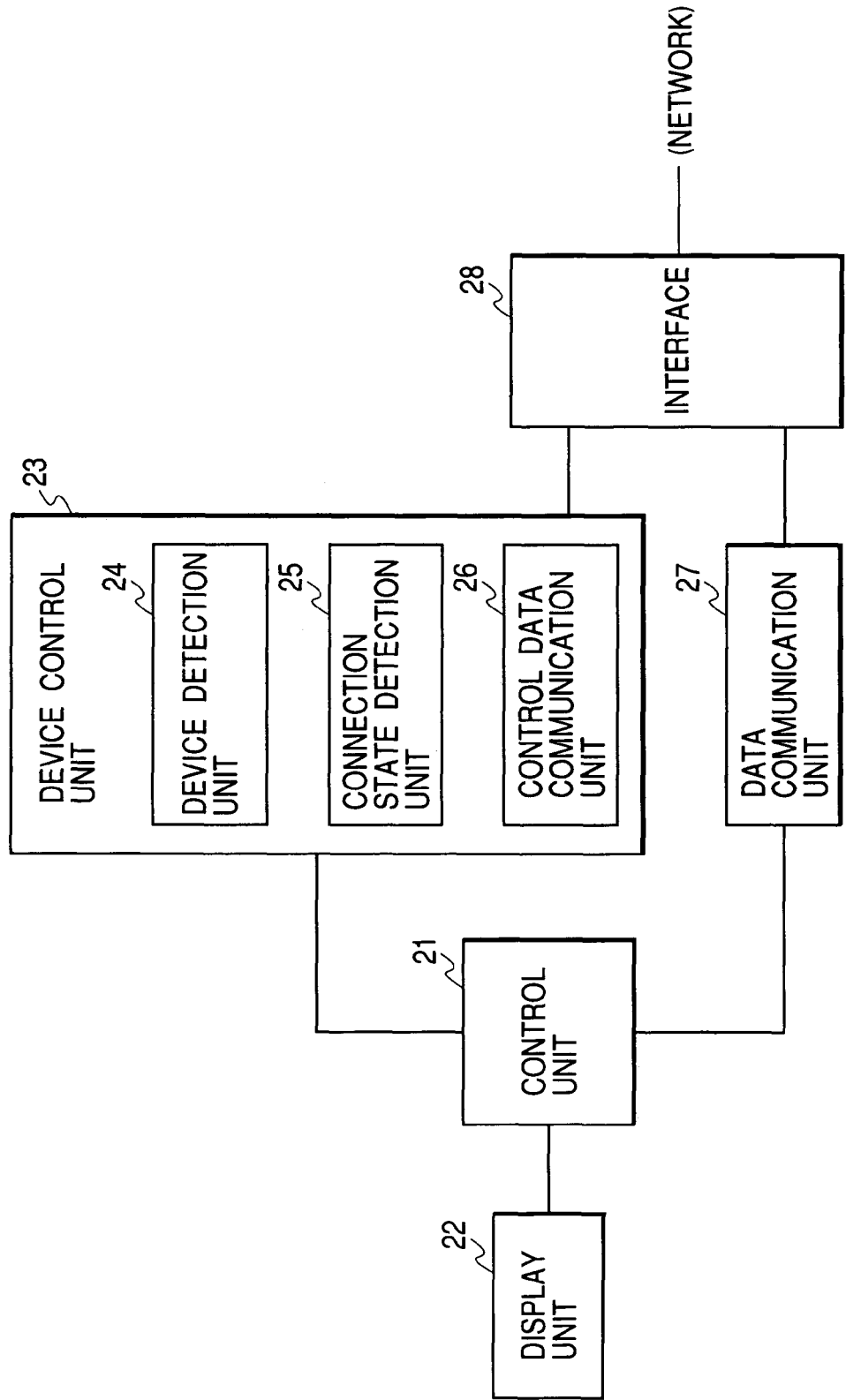
FIG. 2 is a block diagram showing an example of the structure of the communication apparatus of the first embodiment.

FIG. 2 is a block diagram showing an example of the structure of the communication apparatus of the first embodiment.

Referring to FIG. 2, a control unit 21 controls respective functional units of the communication apparatus (a display unit 22, a device control unit 23, a data communication unit 27 and an interface 28). The display unit 22 displays an alarm window (alarm message) to be described later, a device control panel and the like, in response to an instruction from the control unit 21 and the like.

The device control unit 23 is constituted of a device detection unit 24, a connection state detection unit 25 and a control data communication unit 26. The device detection unit 24 detects a device having a particular function (service) from devices connected to the network.

The connection state detection unit 25 detects a connection state between the device detected by the device detection unit 24 and the communication apparatus. More specifically, the connection state detection unit 25 detects whether the device detected by the device detection unit 24 and the communication apparatus are connected so that they can communicate with each other using the protocol dependent upon the transmission medium (specifications of the transmission path).

The control data communication unit 26 transmits over the network control data for controlling the device connected to the network and receives a response thereto to supply it to the control unit 21 and the like. The control data is transmitted/received in accordance with the UPnP protocol.

The data communication unit 27 transfers predetermined data such as moving image data to and from the device detected by the device detection unit 24, in accordance with the protocol dependent upon the transmission medium. The interface 28 is used for connecting the communication apparatus to the network.

Next, the operation will be described.

It is assumed in the following description that DTV 11 shown in FIG. 1 has a control function (the communication apparatus shown in FIG. 2) for DVCR 14 connected to the UPnP network and can receive moving image data by using the IEC61883 protocol.

First, the device detection unit 24 of DTV 11 detects DVCR 14 and acquires the IP address assigned to DVCR 14, in accordance with the UPnP protocol.

Next, the connection state detection unit 25 of DTV 11 detects whether or not DVCR 14 (device) exists on the first IEEE1394 bus connected to DTV 11, by using the ARP (Address Resolution Protocol).

ARP is the protocol for obtaining an IP address from the physical address. In the TCP/IP protocol, ARP can inquire a node having an IP address about its physical address. In the IP over IEEE1394 (a system for transferring an IP packet over a transmission medium capable of data communications in conformity with the IEEE1394 Standard), a physical address corresponds to EUI64 which is identification information (ID) specific to a device in conformity with the IEEE1394 Standard.

FIG. 3 is the diagram showing the format of an ARP request/response packet of IP over 1394. DTV 11 sets the IP address of the device whose physical address is inquired to an ARP request packet, and broadcasts the packet over the first IEEE1394 bus connected to DTV 11, by using an asynchronous data stream (Asynchronous Stream) prescribed in the IEEE P1394a Standard (Reference Document 4: IEEE Std 1394a-2000, IEEE Standard for a High Performance Serial Bus—Amendment 1).

The ARP request packet broadcast from DTV 11 is received by all devices of the IEEE P1394a Standard connected to the first IEEE1394 bus. If the device assigned the IP address set to the ARP request packet is connected to the first IEEE1394 bus, the device transmits an ARP response packet to DTV 11.

In the UPnP network system shown in FIG. 1, DTV 11 inquires DVCR 14 about the physical address. In this case, DTV 11 sets data "192.168.1.2" which is the IP address of DTV 11 to a sender_IP_address field 31 of the ARP request packet, and also sets data "192.168.1.5" which is the IP address of DVCR 14 to a target_IP_address field 32. DTV 11 broadcasts this ARP request packet.

The device having the IP address of "192.168.1.5" is not connected to the first IEEE1394 bus connected to DTV 11. Therefore, there is no response from the device and the ARP response packet is not issued. Since the ARP response packet cannot be received after a lapse of a predetermined time after the ARP request packet was transmitted, DTV 11 can judge that DVCR 14 is not connected directly to the first IEEE1394 bus and is connected to the UPnP network via other bus.

Figure 4:
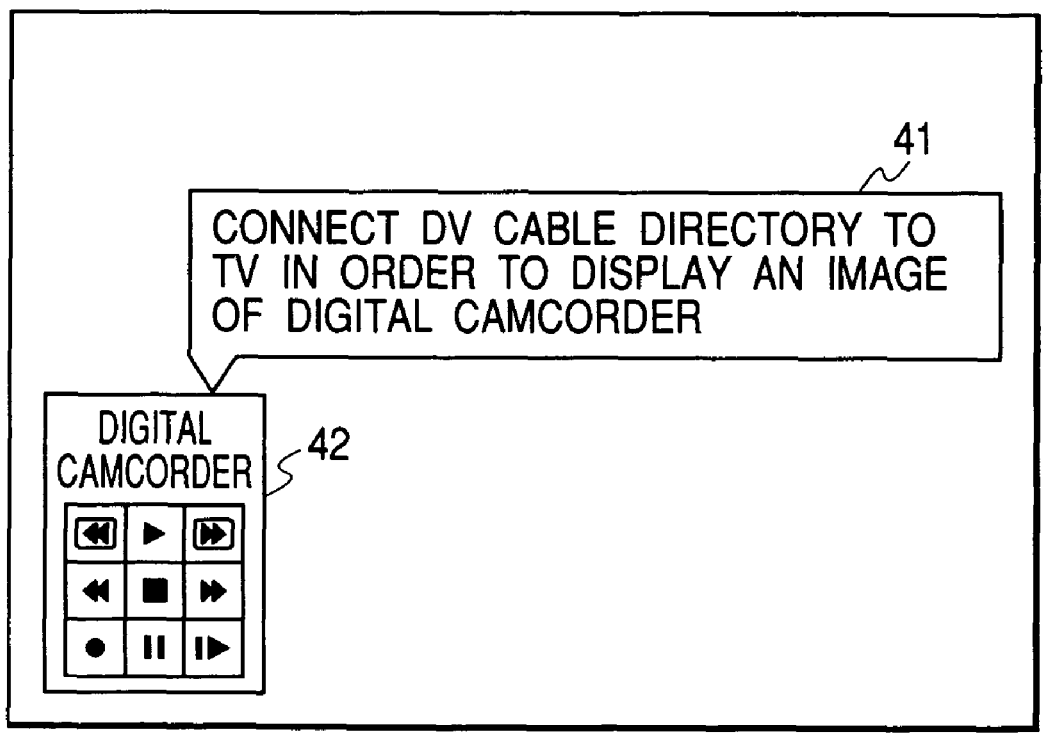
FIG. 4 is a diagram showing an example of an alarm display window according to the first embodiment.

This judgement can clarify that since DTV 11 and DVCR 14 are connected to different IEEE1394 busses, moving image data cannot be received from DVCR 14 by using the IEC61883 protocol, although DVCR 14 can be controlled by using the UPnP protocol. DTV 11 displays an alarm message 41 such as shown in FIG. 4 on a display screen of the display unit 22 to thereby notify the user of that moving image data of images cannot be received.

The alarm message 41 may be displayed not when it is detected that DVCR 14 is not connected to the first IEEE1394 bus, but when a user issues a reproduction request for moving image data or the like by operating a panel 42 for controlling DVCR 14 displayed on the display screen of the display unit 22 of DTV 11.

As described above in detail, according to the first embodiment, after the device detection unit 24 of the communication apparatus possessed by DTV 11 connected to the first IEEE1394 bus detects DVCR 14 capable of data communications in conformity with the IEEE1394 Standard, the connection state detection unit 25 detects whether or not DVCR 14 exists on the first IEEE1394 bus. If this detection result indicates that DVCR 14 is connected to the bus different from the first IEEE1394 bus, DTV 11 displays the alarm message on the display screen of the display unit 22.

In this manner, DTV 11 can notify the user of that moving image cannot be received from DVCR 14, i.e., that DTV 11 and DVCR 14 are not connected through the transmission medium suitable for transmission/reception of moving image data. It is possible to recommend the user to change the connection between DTV 11 and DVCR 14.

Second Embodiment

Next, the second embodiment will be described.

Figure 5:
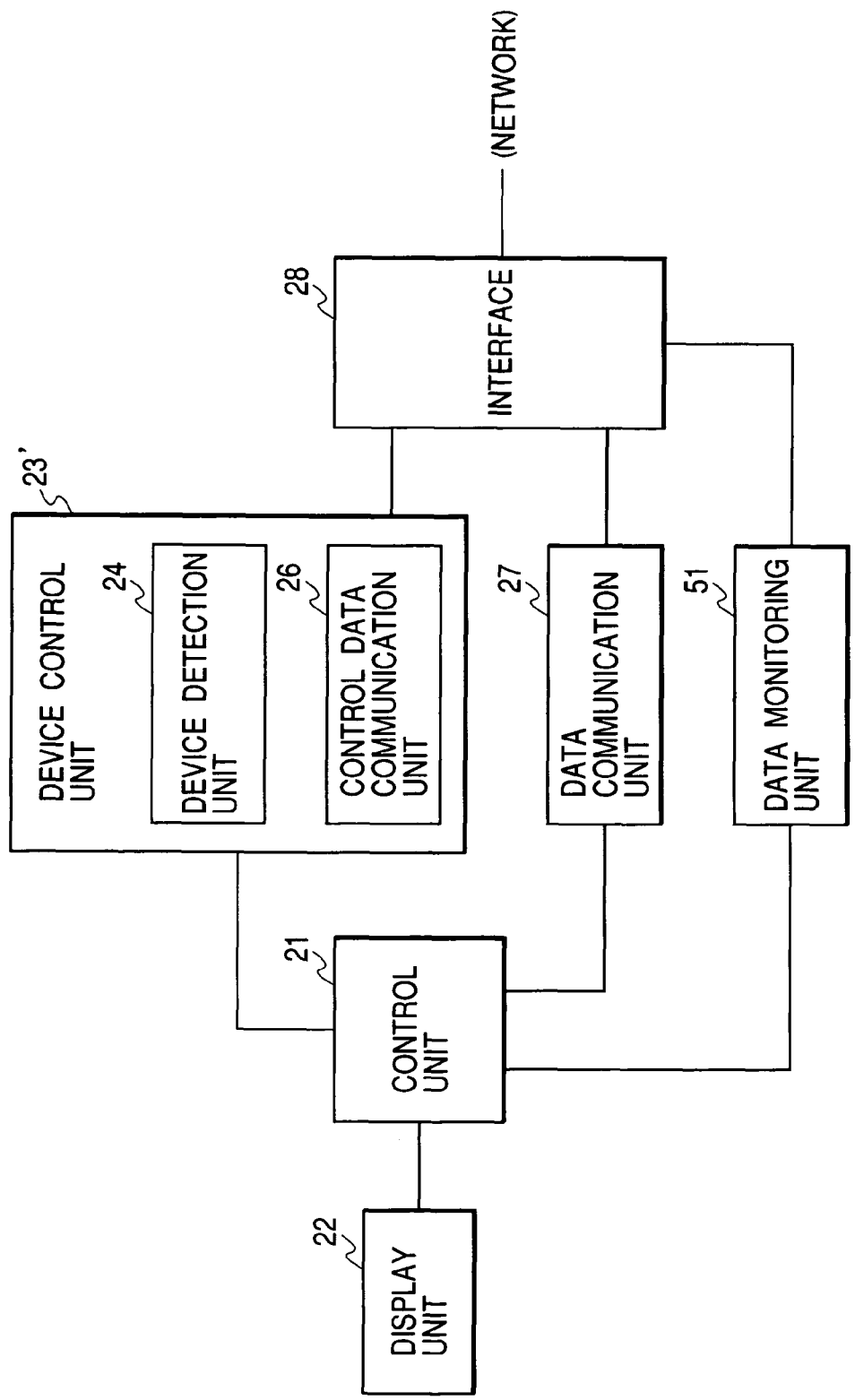
FIG. 5 is a block diagram showing an example of the structure of a communication apparatus according to a second embodiment of the present invention.

FIG. 5 is a block diagram showing an example of the structure of a communication apparatus according to the second embodiment of the present invention. In FIG. 5, blocks having the same function as that of the blocks shown in FIG. 2 are denoted by identical reference numerals, and the duplicated description will be omitted. In FIG. 5, blocks having not the same function but a corresponding function to that of the blocks shown in FIG. 2 are denoted by identical reference numerals with the apostrophe sign (').

Referring to FIG. 5, a device control unit 23' is constituted of the device detection unit 24 and control data communication unit 26. A data monitoring unit 51 monitors data transferred between the device detected by the device detection unit and the communication apparatus in accordance with the protocol dependent upon a transmission medium.

Next, the operation will be described.

It is assumed in the following description that a UPnP network system adopting the communication apparatus of the second embodiment is similar to the UPnP network system shown in FIG. 1. It is also assumed that DTV 11 has the control function (the communication apparatus shown in FIG. 5) for DVCR 14 and can receive moving image data by using the IEC61883 protocol.

Figure 6:
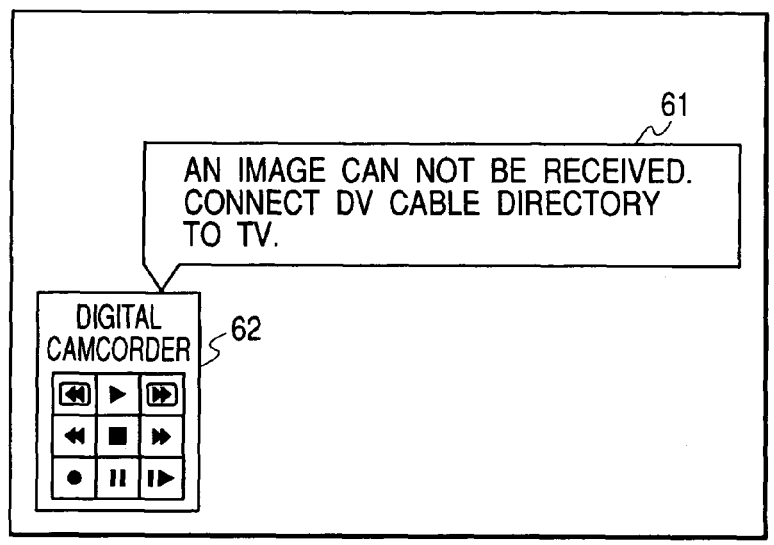
FIG. 6 is a diagram showing an example of an alarm display window according to the second embodiment.

In accordance with the UPnP protocol, the device detection unit 24 of DTV 11 detects DVCR 14 and acquires the function (service) provided by DVCR 14 and the IP address assigned to DVCR 14. DTV 11 displays a panel 62 or the like for controlling DVCR 14 such as shown in FIG. 6 on the screen of the display unit 22.

When a user operates the panel 62 displayed on the screen of the display unit 22 of DTV 11 to issue a reproduction request for moving image data or the like, DTV 11 transmits a reproduction request to the detected DVCR 14, in accordance with the UPnP protocol.

DTV 11 which transmitted the reproduction request to DVCR 14 monitors isochronous data (data transmitted through isochronous transfer) transferred on the first IEEE1394 bus. If moving image data is not received on the first IEEE1394 bus after a lapse of a predetermined time after the reproduction request was transmitted, DTV 11 displays the alarm message 61 on the screen of the display unit 22 to notify the user of that moving image data of images cannot be received.

As described above, according to the second embodiment, after DTV 11 having the communication apparatus transmits a reproduction request (data output request) to DVCR 14 detected by the device detection unit 24, the data monitoring unit 51 monitors moving image data transferred on the first IEEE1394 bus. If moving image data cannot be received on the first IEEE1394 bus after a lapse of the predetermined time, DTV 11 displays the alarm message on the screen of the display unit 22.

In this manner, DTV 11 can notify the user of that moving image cannot be received from DVCR 14 because DTV 11 and DVCR 14 are not connected through the transmission medium suitable for transmission/reception of moving image data. It is possible to recommend the user to change the connection between DTV 11 and DVCR 14.

Third Embodiment

Next, the third embodiment will be described.

Figure 7:
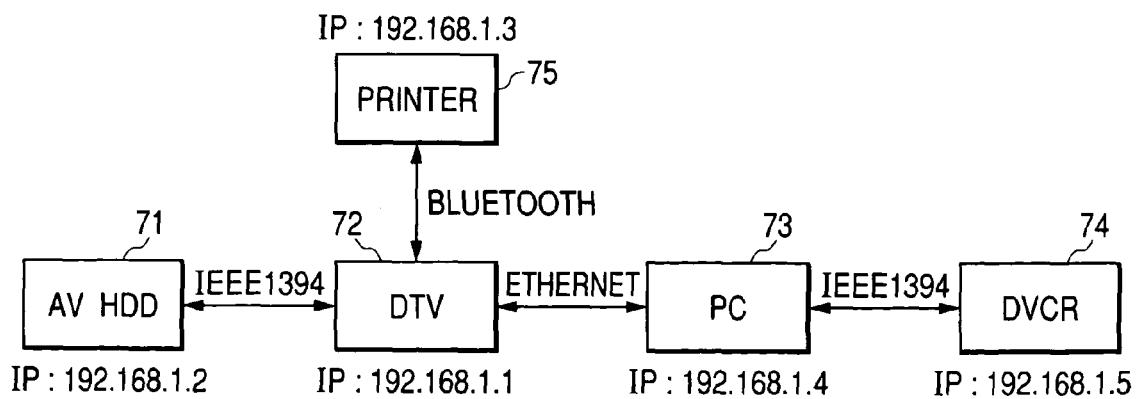
FIG. 7 is a block diagram showing an example of the structure of a UPnP network system adopting a communication apparatus according to a third embodiment of the present invention.

FIG. 7 is a block diagram showing an example of the structure of a UPnP network system adopting a communication apparatus according to the third embodiment of the present invention. In FIG. 7, examples of IP addresses assigned to respective devices are also shown.

The UPnP network system shown in FIG. 7 is constituted of an AV HDD 71 (IP address: 192.168.1.2), a DTV 72 (IP address: 192.168.1.1), a PC 73 (IP address: 192.168.1.4), a DVCR 74 (IP address: 192.168.1.5) and a printer 75 (IP address: 192.168.1.3).

AV HDD 71 and DTV 72 are interconnected through a transmission medium (first IEEE1394 bus) capable of data communications in conformity with the IEEE1394 Standard, and DTV 72 and PC 73 are interconnected through a transmission medium capable of data communications in conformity with the Ethernet (R) Standard. DTV 72 and the printer 75 are interconnected through a transmission medium capable of data communications in conformity with the Bluetooth Standard, and PC 73 and DVCR 74 are interconnected through a transmission medium (second IEEE1394 bus) capable of data communications in conformity with the IEEE1394 Standard.

Figure 8:
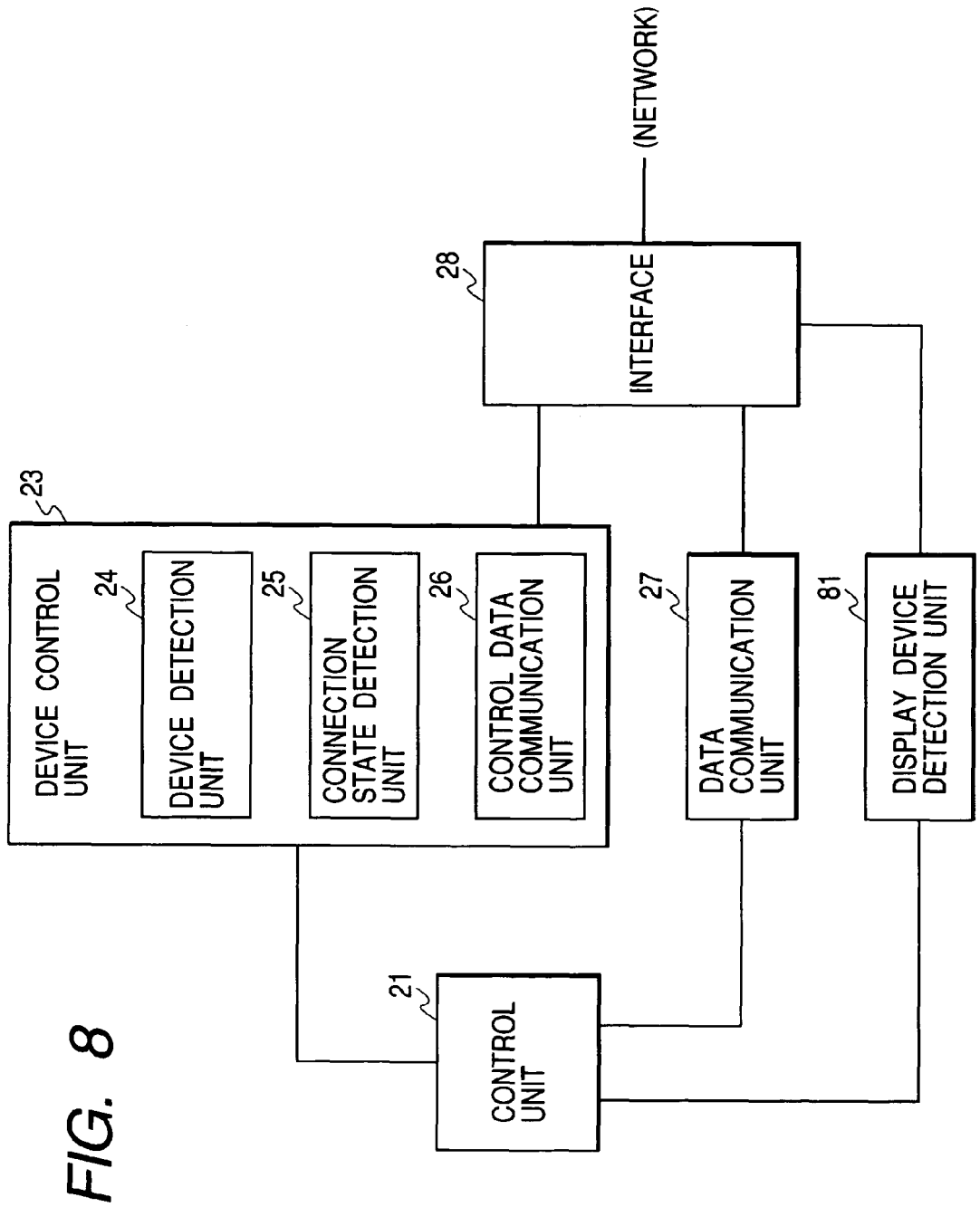
FIG. 8 is a block diagram showing an example of the structure of the communication apparatus of the third embodiment.
Figure 9:
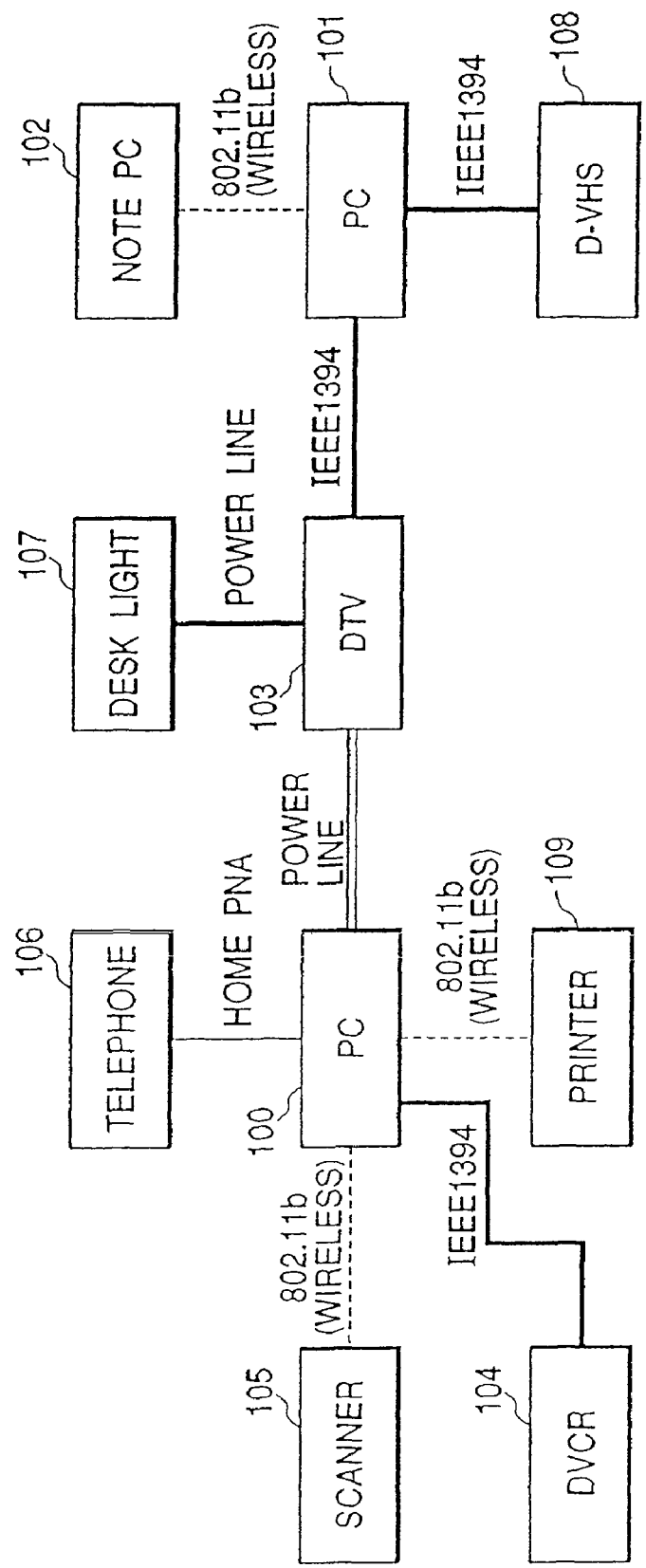
FIG. 9 is a block diagram showing an example of the structure of a UPnP network system.

FIG. 8 is a block diagram showing an example of the structure of the communication apparatus of the third embodiment. In FIG. 8, blocks having the same function as that of the blocks shown in FIG. 2 are denoted by identical reference numerals, and the duplicated description will be omitted.

Referring to FIG. 8, a display device detection unit 81 detects a display device from devices connected to the network.

Next, the operation will be described.

It is assumed in the following description that AV HDD 71 has the control function (the communication apparatus shown in FIG. 8) for DVCR 74 connected to the UPnP network and can transmit/receive moving image data by using the IEC61883 protocol. It is also assumed that AV HDD 71 has operation buttons and the like, and transmits a reproduction request to DVCR 74 in response to operation of a predetermined button or the like to receive moving image data transferred by using the IEC61883 protocol and record the received moving image data on an internal storage medium (hard disk or the like).

First, similar to DTV 11 of the first embodiment, the device detection unit 24 of AV HDD 71 detects. DVCR 74 and acquires the IP address of DVCR 74. Similar to the first embodiment, by using ARP the connection state detection unit 25 of AV HDD 71 detects that DVCR 74 is not directly connected to the first IEEE1394 bus connected to AV HDD 71.

It is possible to know from the detection result by the connection state detection unit 25 that although AV HDD 71 can control DVCR 74 by the UPnP protocol, moving image cannot be received from DVCR 74 by using the IEC61883 protocol.

The display device detection unit 81 of AV HDD 71 detects DTV 72 having a display unit by using the UPnP protocol.

AV HDD 71 transmits alarm display data to DTV 72 detected by the display device detection unit 81 to make DTV 72 display the alarm message 41 such as shown in FIG. 4 indicating that moving image cannot be received from DVCR 74.

In this case, AV HDD 71 encodes, for example, image data (alarm display data) of an alarm display image containing the alarm message 61, by using the data compression format used by DTV 72. AV HDD 71 transmits the encoded alarm display data as isochronous data capable of being transmitted over the IEEE1394 bus by using the IEC61883 protocol.

DTV 72 displays the alarm message in the received alarm display data on a display screen to notify the user of that moving image data cannot be received.

As described above, according to the third embodiment, in addition to the advantageous effects of the first embodiment, even the device without a display device can display the alarm message by utilizing the display device connected to the network, since the communication apparatus is provided with the display device detection unit 81 which detects the display device from devices connected to the network.

Fourth Embodiment

Next, the fourth embodiment will be described.

A communication apparatus according to the fourth embodiment of the present invention is not provided with the display unit 22 of the communication apparatus of the second embodiment shown in FIG. 5, and is provided with the display device detection unit 81 of the communication apparatus of the third embodiment shown in FIG. 8 to detect a display device from devices connected to the network.

Description will be made on the operation of the communication apparatus of the fourth embodiment applied to the UPnP network system shown in FIG. 7.

Similar to the third embodiment, it is assumed in the following description that AV HDD 71 has the control function for DVCR 74 and can transmit/receive moving image data by using the IEC61883 protocol. It is also assumed that when the operation button or the like is operated, AV HDD 71 transmits a reproduction request to DVCR 74 to receive moving image data transmitted by using the IEC61883 protocol and record the received moving image data on an internal storage medium.

By using the UPnP protocol, the device detection unit 24 of AV HDD 71 detects DVCR 74, and the display device detection unit 81 detects DTV 72 having the display unit. AV HDD 71 acquires the functions (services) provided by DTV 72 and DVCR 74 and the IP addresses thereof.

When a user operates the operation button or the like of AV HDD 71 and issues a data record request, AV HDD 71 transmits a reproduction request to DVCR 74 by using the UPnP protocol.

AV HDD 71 which transmitted the reproduction request to DVCR 74 monitors isochronous data transmitted on the first IEEE1394 bus. If moving image data is not received on the first IEEE1394 bus after a lapse of a predetermined time, AV HDD 71 transmits alarm display data to make the detected DTV 72 display the alarm message 61 such as shown in FIG. 6.

In this case, AV HDD 71 encodes, for example, image data (alarm display data) of an alarm display image containing the alarm message 61, by using the data compression format used by DTV 72. AV HDD 71 transmits the encoded alarm display data as isochronous data over the IEEE1394 bus by using the IEC61883 protocol.

DTV 72 displays the alarm message in the received alarm display data on a display screen to notify the user of that moving image data cannot be received.

As described above, according to the fourth embodiment, in addition to the advantageous effects of the second embodiment, even the device without the display device can display the alarm message by utilizing the display device connected to the network, since the communication apparatus is provided with the display device detection unit which detects the display device from devices connected to the network.

Other Embodiments

The scope of the invention also contains the case wherein software program codes realizing the function of each of the above-described first, second, third and fourth embodiments are supplied to a computer (CPU or MPU) of a device or system connected to various devices realizing the embodiment function, and the computer operates the devices in accordance with the stored programs.

In this case, the software program codes themselves realize the embodiment function. Therefore, the program codes themselves and means for supplying the program codes, e.g., a storage medium storing the program codes, constitute the present invention. The storage medium for storing such program codes may be a flexible disk, a hard disk, an optical disk, a magneto optical disk, a CD-ROM, a magnetic tape, a non-volatile memory card, a ROM or the like.

It is obvious that the program codes are included in the embodiment of the invention, wherein not only the computer executes the supplied program codes to realize the embodiment function but also the program codes in cooperation with an OS (operating system) running on the computer or with another application or the like realize the embodiment function.

It is obvious that the scope of the invention also contains the case wherein the functions of each embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

The above-described preferred embodiments are merely exemplary of the present invention, and are not construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. A communication apparatus capable of connecting to a network and capable of controlling a controlled device having a predetermined function, comprising:

a device detecting unit that (a) detects the controlled device among a plurality of devices connected to the network, and (b) obtains an IP address of the controlled device, wherein the device detecting unit uses a first communication protocol to detect the controlled device and to obtain the IP address of the controlled device;

a communication unit that transmits a request for inquiring whether the controlled device having the obtained IP address is directly connected to the communication apparatus via a first transmission medium which uses a second communication protocol, the communication apparatus being directly connected to the first transmission medium, and the request being transmitted via the first transmission medium; and a determining unit that determines whether the communication apparatus and the controlled device are directly connected to the first transmission medium for communication via the second communication protocol, wherein the determining unit (a) determines that the communication apparatus and the controlled device are directly connected to the first transmission medium, if a response corresponding to the request transmitted by the communication unit is received from the controlled device, and (b) determines that the communication apparatus and the controlled device are not directly connected to the first transmission medium but that the controlled device is connected to the network via a second transmission medium different from the first transmission medium, if no response corresponding to the request is received from the controlled device, thereby the communication apparatus and the controlled device are not able to communicate with each other using the second communication protocol via the first transmission medium but are able to communicate with each other via the first communication protocol, wherein the communication apparatus displays warning information on a display unit if the determining unit determines that the communication apparatus and the controlled device are not directly connected to the first transmission medium and the controlled device is connected to the network via the second transmission medium.

2. The communication apparatus according to claim 1, wherein the display unit that displays the warning information is a display unit of the communication apparatus.

3. The communication apparatus according to claim 1, wherein the display unit that displays the warning information is a display unit of an external device.

4. The communication apparatus according to claim 1, wherein the first communication protocol conforms to UPnP (Universal Plug and Play) and the second communication protocol conforms to the IEEE1394 standard.

5. A method performed by a communication apparatus that is capable of connecting to a network and capable of controlling a controlled device having a predetermined function, comprising:

a device detecting step that (a) detects the controlled device among a plurality of devices connected to the network, and (b) obtains an IP address of the controlled device, wherein the device detecting step uses a first communication protocol to detect the controlled device and to obtain the IP address of the controlled device;

a communication step that transmits a request for inquiring whether the controlled device having the obtained IP address is directly connected to the communication apparatus via a first transmission medium which uses a second communication protocol, the communication apparatus being directly connected to the first transmission medium, and the request being transmitted via the first transmission medium;

a determining step that determines whether the communication apparatus and the controlled device are directly connected to the first transmission medium for communication via the second communication protocol, wherein the determining step (a) determines that the communication apparatus and the controlled device are directly connected to the first transmission medium, if a response corresponding to the request transmitted by the communication step is received from the controlled device, and (b) determines that the communication apparatus and the controlled device are not directly connected to the first transmission medium but that the controlled device is connected to the network via a second transmission medium different from the first transmission medium, if no response corresponding to the request is received from the controlled device, thereby the communication apparatus and the controlled device are not able to communicate with each other using the second communication protocol via the first transmission medium but are able to communicate with each other via the first communication protocol; and a displaying step that displays warning information on a display unit if the determining step determines that the communication apparatus and the controlled device are not directly connected to the first transmission medium and the controlled device is connected to the network via the second transmission medium.

6. The method according to claim 5, wherein the display unit that displays the warning information is a display unit of the communication apparatus.

7. The method according to claim 5, wherein the display unit that displays the warning information is a display unit of an external device.

8. The method according to claim 5, wherein the first communication protocol conforms to UPnP (Universal Plug and Play) and the second communication protocol conforms to the IEEE1394 standard.

9. A computer readable storage medium on which is stored a computer executable program to execute a method performed by a communication apparatus, the communication apparatus being capable of connecting to a network and being capable of controlling a controlled device having a predetermined function, the program comprising:

a device detecting step that (a) detects the controlled device among a plurality of devices connected to the network, and (b) obtains an IP address of the controlled device, wherein the device detecting step uses a first communication protocol to detect the controlled device and to obtain the IP address of the controlled device;

a communication step that transmits a request for inquiring whether the controlled device having the obtained IP address is directly connected to the communication apparatus via a first transmission medium which uses a second communication protocol, the communication apparatus being directly connected to the first transmission medium, and the request being transmitted via the first transmission medium;

a determining step that determines whether the communication apparatus and the controlled device are directly connected to the first transmission medium for communication via the second communication protocol, wherein the determining step (a) determines that the communication apparatus and the controlled device are directly connected to the first transmission medium, if a response corresponding to the request transmitted by the communication step is received from the controlled device, and (b) determines that the communication apparatus and the controlled device are not directly connected to the first transmission medium but that the controlled device is connected to the network via a second transmission medium different from the first transmission medium, if no response corresponding to the request is received from the controlled device, thereby the communication apparatus and the controlled device are not able to communicate with each other using the second communication protocol via the first transmission medium but are able to communicate with each other via the first communication protocol; and a displaying step that displays warning information on a display unit if the determining step determines that the communication apparatus and the controlled device are not directly connected to the first transmission medium and the controlled device is connected to the network via the second transmission medium.

10. The computer readable storage medium according to claim 9, wherein the display unit that displays the warning information is a display unit of the communication apparatus.

11. The computer readable storage medium according to claim 9, wherein the display unit that displays the warning information is a display unit of an external device.

12. The computer readable storage medium according to claim 9, wherein the first communication protocol conforms to UPnP (Universal Plug and Play) and the second communication protocol conforms to the IEEE1394 standard.

* * * * *